US012775144B2

(12) United States Patent
Winzer

(10) Patent No.: US 12,775,144 B2
(45) **Date of Patent: *Oct. 27, 2026**

(54) OPTICAL FIBER CABLE AND RACEWAY THEREFOR

(71) Applicant: Ciena Corporation, Hanover, MD (US)

(72) Inventor: Peter Johannes Winzer, Aberdeen, NJ (US)

(73) Assignee: Ciena Corporation, Fulton, MD (US)

( * ) Notice: Subject to any disclaimer, the term of this patent is extended or adjusted under 35 U.S.C. 154(b) by 343 days.

This patent is subject to a terminal disclaimer.

(21) Appl. No.: 18/405,366

(22) Filed: Jan. 5, 2024

(65) Prior Publication Data

US 2024/0402447 A1 Dec. 5, 2024

Related U.S. Application Data

(63) Continuation of application No. 17/543,273, filed on Dec. 6, 2021, now Pat. No. 11,899,258, which is a continuation of application No. 16/822,103, filed on Mar. 18, 2020, now Pat. No. 11,194,109.

(51) Int. Cl.
*G02B 6/44* (2006.01)
*G02B 6/50* (2006.01)

(52) U.S. Cl.
CPC ........... *G02B 6/4432* (2013.01); *G02B 6/443* (2013.01); *G02B 6/4459* (2013.01); *G02B 6/50* (2013.01)

(58) Field of Classification Search
CPC .............................. G02B 6/4459; G02B 6/443
See application file for complete search history.

(56) References Cited

U.S. PATENT DOCUMENTS

| | | | |
|---|---|---|---|
| 5,155,789 | A | 10/1992 | Le Noane et al. |
| 5,956,446 | A | 9/1999 | Benzel |
| 6,226,431 | B1 | 5/2001 | Brown et al. |
| 6,249,631 | B1 | 6/2001 | LeVey |
| 6,284,975 | B1 | 9/2001 | Paschal et al. |
| 6,321,013 | B1 | 11/2001 | Hardwick, III et al. |
| 8,369,668 | B1 | 2/2013 | McNutt et al. |
| 8,737,788 | B2 | 5/2014 | Keller et al. |
| 8,913,862 | B1 | 12/2014 | Emmerich et al. |
| 9,581,777 | B2 | 2/2017 | Baucom et al. |
| 10,481,346 | B2 | 11/2019 | Ohmura |

(Continued)

FOREIGN PATENT DOCUMENTS

| | | | |
|---|---|---|---|
| CN | 1043793 | A | 7/1990 |
| CN | 1723331 | A | 1/2006 |

(Continued)

OTHER PUBLICATIONS

ABCO Subsea, Polyurethane Vertebrae Bend Restrictor, retrieved from Internet: <https://www.abcosubsea.com/products/bendimiters/polyurethane-vertebrae-bend-restrictor>, 2 pages (2020).

(Continued)

*Primary Examiner* — Sung H Pak
(74) *Attorney, Agent, or Firm* — Michael Best & Friedrich LLP

(57) ABSTRACT

Provided are (i) a fiber-optic cable having a cable sheath that enables significant changes in the cable's cross-sectional shape when the cable is bent and (ii) a raceway that can be used to deploy such a fiber-optic cable.

34 Claims, 6 Drawing Sheets

(56) References Cited

U.S. PATENT DOCUMENTS

| | | | | |
|---|---|---|---|---|
| 11,153,670 | B1 | 10/2021 | Winzer | |
| 11,194,109 | B2 * | 12/2021 | Winzer | G02B 6/50 |
| 11,287,585 | B2 | 3/2022 | Winzer | |
| 11,899,258 | B2 * | 2/2024 | Winzer | G02B 6/4459 |
| 2004/0184749 | A1 | 9/2004 | Herbst et al. | |
| 2006/0280413 | A1 | 12/2006 | Paschal et al. | |
| 2007/0012436 | A1 | 1/2007 | Freyer | |
| 2008/0181564 | A1 | 7/2008 | Overton et al. | |
| 2009/0041414 | A1 | 2/2009 | Lavenne et al. | |
| 2009/0097213 | A1 | 4/2009 | Bicknell et al. | |
| 2009/0129733 | A1 | 5/2009 | Keller et al. | |
| 2013/0163935 | A1 | 6/2013 | Sasaki | |
| 2013/0233880 | A1 | 9/2013 | Rago et al. | |
| 2014/0178019 | A1 | 6/2014 | Sakabe et al. | |
| 2014/0199037 | A1 | 7/2014 | Hurley et al. | |
| 2014/0219609 | A1 | 8/2014 | Nielson et al. | |
| 2015/0286024 | A1 | 10/2015 | Kolesar | |
| 2016/0054531 | A1 | 2/2016 | Baca et al. | |
| 2018/0335576 | A1 | 11/2018 | Farbert et al. | |
| 2019/0072726 | A1 | 3/2019 | Ohmura | |
| 2019/0384026 | A1 | 12/2019 | Bickhann et al. | |
| 2021/0294052 | A1 | 9/2021 | Winzer et al. | |
| 2021/0376950 | A1 | 12/2021 | Winzer | |
| 2022/0091351 | A1 | 3/2022 | Winzer | |
| 2022/0159860 | A1 | 5/2022 | Winzer et al. | |
| 2022/0244465 | A1 | 8/2022 | Winzer et al. | |
| 2022/0263586 | A1 | 8/2022 | Winzer | |
| 2022/0264759 | A1 | 8/2022 | Sawyer et al. | |
| 2023/0134543 | A1 | 5/2023 | Winzer | |

FOREIGN PATENT DOCUMENTS

| | | | |
|---|---|---|---|
| CN | 104011574 | A | 8/2014 |
| EP | 0373846 | | 6/1990 |
| JP | 2008-501151 | | 1/2008 |
| JP | 2011-081089 | | 4/2011 |
| TW | 201802509 | A | 1/2018 |
| WO | WO 2008/054666 | A2 | 5/2008 |
| WO | WO 2004/057715 | A2 | 7/2024 |

OTHER PUBLICATIONS

Corning Data Sheet, RocketRibbon™ Extreme Density Cable, retrieved from Internet: <https://www.corning.com/ catalog/coc/documents/product-specifications/Y56ZQ4-14101 S53 NAFT A_AEN .PDF>, 3 pages (2020).

Extended European Search Report in European Appln. No. 21771175.3, mailed on Mar. 20, 2024, 8 pages.

Fosco, 101 Guidelines for Fiberoptic Cable Installation, retrieved from Internet: <https://www.fiberoptics4sale.com/blogs/archive-posts/9504 7814-101-guidelines-for-fiber--0ptic-cable-installation>, 17 pages (2020).

Hose Master, Stripwound Metal Hose and Assemblies Catalog, retrieved from Internet: <https://www.hosemaster.com/,vp-content/uploads/StripwoundCatalog.pdf>, 20 pages (2020).

International Preliminary Report on Patentability in International Appln. No. PCT/US2021/022730, mailed Sep. 29, 2022, 20 pages.

PCT International Search Report and Written Opinion in International Appln. PCT/US2021/022730, dated Jul. 21, 2021, 24 pages.

PCT Invitation to Pay Additional Fees in International Appln. No. PCT/US2021/022730, dated May 25, 2021, 2 pages.

Smith et al., Ribbon vs. Loose Tube Fiber Cabling, Proceedings of the OFC/NFOEC Conference, 3 pages (2007).

Sumitomo Electric Lightwave Data Sheet, Freeform Ribbon(R) Slotted Core Ribbon Cable, retrieved from Internet: <https://www.sumitomoelectric.com/wp-content/uploads/2016/08/3456-Slotled-Core-OSP.pdf>, 1 page (2020).

Van Vickle, Optical Fiber Cable Design and Reliability, retrieved from Internet: <https://www.ieee802.org/3/bm/public/rnay14/vanvickle_01_0514_optx.pdf>, 28 pages (2020).

Machine Translation of JP 2008-501151, published Jan. 17, 2008, 13 pages.

China National Intellectual Property Office Second Office Action for Application No. 202180035869.8 dated May 9, 2026 (17 pages including English machine translation).

* cited by examiner

100

201

202

203

102

102

300

302

302

302

302

302

302

102

102

600

611

612

613

610

611

612

613

OPTICAL FIBER CABLE AND RACEWAY THEREFOR

CROSS-REFERENCE TO RELATED APPLICATIONS

This application is a continuation application of U.S. application Ser. No. 17/543,273, filed on Dec. 6, 2021, which is a continuation application of and claims priority under 35 U.S.C. § 120 to U.S. application Ser. No. 16/822,103, filed on Mar. 18, 2020, now U.S. Pat. No. 11,194,109.

BACKGROUND

Field

Various example embodiments relate to optical communication equipment and, more specifically but not exclusively, to fiber-optic cables.

Description of the Related Art

This section introduces aspects that may help facilitate a better understanding of the disclosure. Accordingly, the statements of this section are to be read in this light and are not to be understood as admissions about what is in the prior art or what is not in the prior art.

As the input/output (I/O) capacities of electronic processing chips increase, electrical signals may not provide sufficient I/O capacity across the limited size of a practically viable electronic chip package. A feasible alternative may be to interconnect electronic chip packages using optical signals, which can typically be delivered with a much higher I/O capacity per unit area compared to electrical I/Os.

SUMMARY OF THE INVENTION

Disclosed herein are various embodiments of (i) a fiber-optic cable having a cable sheath that enables significant changes in the cable's cross-sectional shape when the cable is bent and (ii) a raceway that can be used to deploy such a fiber-optic cable.

According to an example embodiment, provided is a fiber-optic cable comprising a cable segment that has a plurality of optical fibers laterally encased by a cable sheath; and the cable segment is constructed to permit relative lateral movement of at least some of the optical fibers within the cable sheath to change a cross-sectional shape of the cable segment.

In some embodiments of the above fiber-optic cable, the cable segment is configured to change the cross-sectional shape in response to being bent.

In some embodiments of any of the above fiber-optic cables, in a bent portion of the cable segment, a pair of the optical fibers is laterally separated by a larger distance than any two of the optical fibers in a straight portion of the cable segment.

In some embodiments of any of the above fiber-optic cables, in a bent portion of the cable segment, a pair of the optical fibers is laterally separated by a larger distance than any two points in an orthogonal cross-section of a straight portion of the cable segment.

In some embodiments of any of the above fiber-optic cables, the cable sheath comprises a layer of a laterally flexible material.

In some embodiments of any of the above fiber-optic cables, the cable sheath comprises a layer of a laterally stretchable material.

In some embodiments of any of the above fiber-optic cables, the plurality of optical fibers comprises at least 100 optical fibers.

In some embodiments of any of the above fiber-optic cables, the plurality of optical fibers comprises at least 1000 optical fibers.

In some embodiments of any of the above fiber-optic cables, the cable segment further comprises one or more strength members.

In some embodiments of any of the above fiber-optic cables, the cable segment is constructed to permit lateral movement of at least some of the optical fibers with respect to the one or more strength members.

In some embodiments of any of the above fiber-optic cables, at least some of the strength members are distributed throughout an interior of the cable.

In some embodiments of any of the above fiber-optic cables, at least some of the strength members are more concentrated near a center of the cable.

In some embodiments of any of the above fiber-optic cables, at least some of the strength members are attached to an inner surface of the cable sheath.

In some embodiments of any of the above fiber-optic cables, at least some of the strength members are embedded within the cable sheath.

In some embodiments of any of the above fiber-optic cables, at least some of the strength members are attached to an outer surface of the cable sheath.

According to another example embodiment, provided is an apparatus comprising a raceway having a hollow cable conduit, the hollow cable conduit having a curved portion and a straight portion connected to the curved portion, the curved portion of the hollow cable conduit having a larger cross-sectional size measured orthogonally to a main plane of the raceway than a corresponding cross-sectional size of the straight portion of the hollow cable conduit.

In some embodiments of the above apparatus, the raceway has a substantially constant height along the curved and straight portions, said height being measured orthogonally to the main plain.

In some embodiments of any of the above apparatus, the raceway has a larger height along the curved portion than along the straight portion, said height being measured orthogonally to the main plain.

In some embodiments of any of the above apparatus, the apparatus further comprises a fiber-optic cable laid in the hollow cable conduit of the raceway.

In some embodiments of any of the above apparatus, the fiber-optic cable comprises a cable segment that has a plurality of optical fibers laterally encased by a cable sheath; and the cable segment is constructed to permit relative lateral movement of at least some of the optical fibers within the cable sheath to change a cross-sectional shape of the cable segment.

BRIEF DESCRIPTION OF THE DRAWINGS

Other aspects, features, and benefits of various disclosed embodiments will become more fully apparent, by way of example, from the following detailed description and the accompanying drawings, in which.

DETAILED DESCRIPTION OF SOME EMBODIMENTS

Emerging optical interconnects aim to co-package and even co-integrate optical transponders and electronic processing chips, which necessitates transponder solutions that consume relatively low power and that are sufficiently robust against significant temperature variations often present within an electronic processing chip package. Of significant interest are massively spatially parallel optical interconnect solutions that multiplex information signals onto relatively few wavelengths and use a relatively large number of parallel spatial paths for chip-to-chip interconnection. Although some optical cables carrying as many as 3456 strands of optical telecommunication fiber are commercially available, their relatively large cross-section, relative bend-inflexibility, and relatively high weight may make such optical cables unfavorable or even unusable for chip-to-chip interconnection applications.

Figure 1:
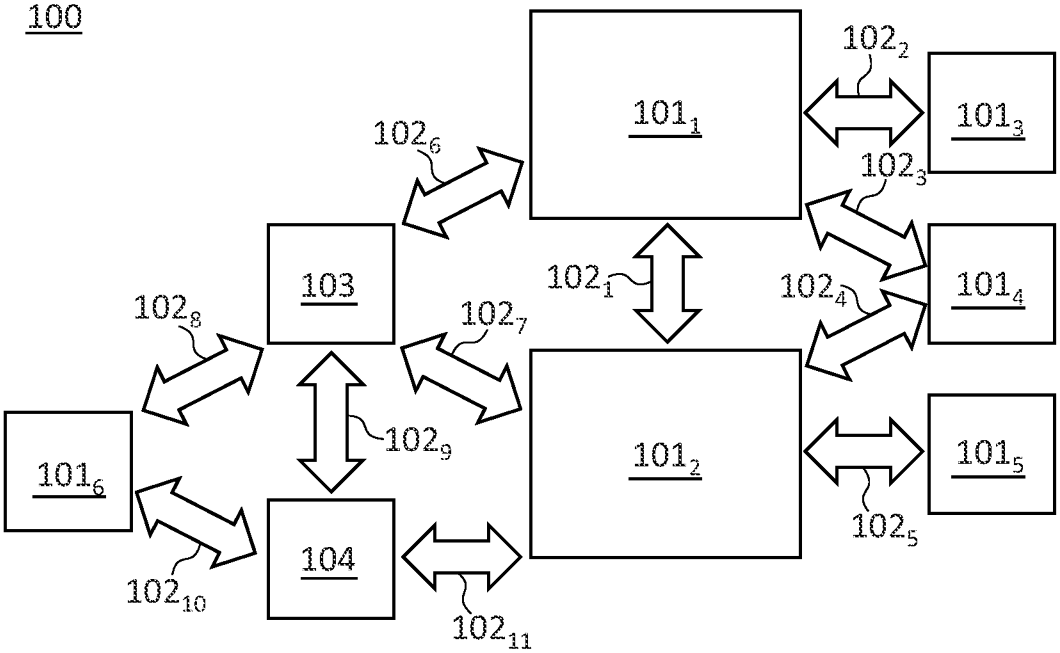
FIG. 1 shows a block diagram of an optical communication system in which at least some embodiments may be practiced.

FIG. 1 shows a block diagram of a communication system 100 in which at least some embodiments may be practiced. As shown, system 100 comprises integrated optical communication devices $\mathbf{101}_1$-$\mathbf{101}_6$ suitably interconnected by optical fiber cables $\mathbf{102}_1$-$\mathbf{102}_{11}$ establishing communication paths between the communication devices. Communication system 100 may also comprise one or more external optical power supply modules 103 producing continuous-wave (CW) light or producing one or more trains of periodic or non-periodic optical pulses for use in one or more of the integrated optical communication devices $\mathbf{101}_1$-$\mathbf{101}_6$. Some end-to-end communication paths may pass through external optical power supply modules 103 (e.g., see the communication path between devices $\mathbf{101}_2$ and $\mathbf{101}_6$). For example, the communication path between devices $\mathbf{101}_2$ and $\mathbf{101}_6$ may be jointly established by optical fiber cables $\mathbf{102}_7$ and $\mathbf{102}_8$, whereby light from external optical power supply 103 is multiplexed onto optical fiber cables $\mathbf{102}_7$ and $\mathbf{102}_8$. Some end-to-end communication paths may pass through a multiplexing unit 104 (e.g., see the communication path between devices $\mathbf{101}_2$ and $\mathbf{101}_6$). For example, the communication path between devices $\mathbf{101}_2$ and $\mathbf{101}_6$ may be jointly established by optical fiber cables $\mathbf{102}_{10}$ and $\mathbf{102}_{11}$, whereby light from external optical power supply 103 may be multiplexed within multiplexing unit 104 onto optical fiber cables $\mathbf{102}_{10}$ and $\mathbf{102}_{11}$.

Figure 2A:
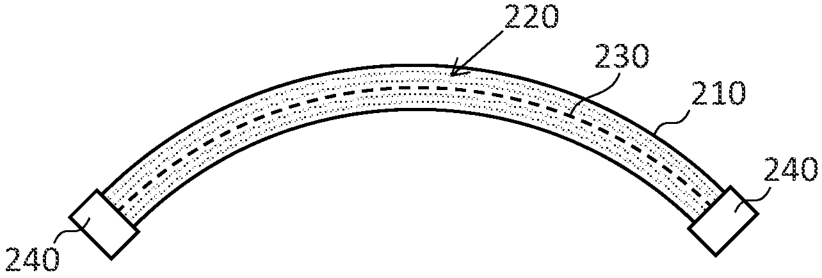
FIGS. 2A-2C illustrate certain features of an optical fiber cable that can be used in the optical communication system of FIG. 1 according to an embodiment.
Figure 2B:
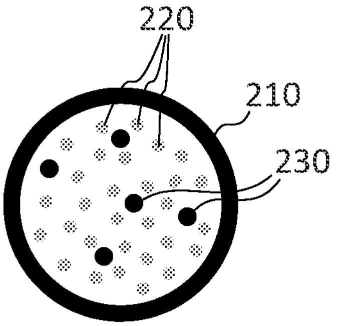
Figure 2C:
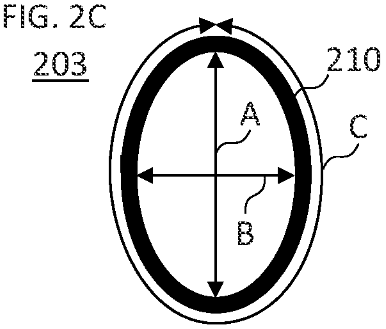

FIGS. 2A-2C illustrate certain features of optical fiber cable 102 that can be used in system 100 (FIG. 1) according to some embodiments. More specifically, FIG. 2A shows an example longitudinal-section 201 of optical fiber cable 102 according to some embodiments. FIG. 2B shows an example cross-section 202 of optical fiber cable 102 according to some embodiments. FIG. 2C shows an example cross-section 203 of a cable sheath 210 of optical fiber cable 102 according to some embodiments. The shown longitudinal-section 201 and cross-sections 202 and 203 may or may not correspond to the same optical fiber cable 102.

As shown in FIGS. 2A and 2B, each of optical fiber cables 102 comprise a respective sheath 210, a respective plurality of optical fiber strands 220 (shown in dotted gray in FIG. 2A), and respective one or more strength members 230 (shown in dashed black in FIG. 2A). Individual cables 102 may be terminated by connectors 240 that are designed to make the connection thereof to system elements 101, 103, and/or 104 relatively effortless and/or straightforward. In various embodiments, fiber strands 220 may be loosely contained within sheath 210, may be arranged in ribbons, or may be compartmentalized into tubes or sectors. In some embodiments, individual fiber strands 220 may be coated by a relatively thin layer of soft plastic (e.g., up to the cross-sectional diameter of about 250 micrometers) and optionally additionally be coated by a thicker layer of harder plastic (e.g., up to the cross-sectional diameter of about 900 micrometers).

In various embodiments, strength members 230 may be variously arranged, e.g., in the middle of cable 102, near sheath 210, embedded within sheath 210, and/or distributed throughout the cable cross-section. FIG. 2B shows a non-limiting example of the latter distribution. Example materials from which strength members 230 can be made include but are not limited to steel, fiberglass, and aramid yarn. In some embodiments, some strength members 230 may be attached to sheath 210 and/or to the cable end points at the housing of connector(s) 240. Sheath 210 may be designed to approximately maintain a certain cross-sectional shape, such as a substantially circular cross-sectional shape, across the cable's length (e.g., see FIG. 2B), even if the cable is bent or curved to create segments having a minimum recommended bend radius. For some cables 102, tighter-than-recommended bending may result in kinking and/or buckling of sheath 210 or irreversible damage inside the cable, e.g., when the tensile strain (at the outer side of the bend) or the compressive stress (at the inner side of the bend) exceeds the elastic-deformation limits of some of the materials making up the cable. Kinking, buckling, or breaking may, inter alia, result in damaged optical fiber strands 220.

Some cable features directed at the prevention of the cable 102 kinking, buckling, and/or breaking may include: (i) hard-to-bend sheaths, such as sheaths made of stiff materials; (ii) relatively thick sheaths; (iii) braided sheaths; (iv) spiral wraps; (v) mono-coil sheaths; and (vi) bend-restricting sheaths, such as the interlocking hose designs and interlocking vertebrae bend restrictors.

A typical recommended bend radius for conventional optical cables can be approximately 10 times the outer cable diameter. Conventional, commercially available cables for carrying one thousand or more fiber strands may have outer cable diameters on the order of one inch, which corresponds to a recommended minimum bend radius on the order of 10 inches. The latter cable characteristic may make some conventional cables unsuitable for some compact applications, such as those corresponding to some embodiments of system 100 (FIG. 1).

These and possibly other related problems in the state of the art can be addressed using at least some embodiments of cables 102, in which sheaths 210 are constructed to be laterally flexible and/or laterally stretchable, e.g., as explained in more detail below, in reference to FIGS. 2C and 3A-3C. Such laterally flexible/stretchable sheaths 210 may be very different from and should be contrasted with typical conventional sheaths, e.g., used in outdoor cabling environments. For example, some embodiments of cables 102 disclosed herein may advantageously afford bend radii that are very close to the bend radii afforded by individual optical fiber strands 220 used therein. Such tight bend radii may not be achievable with conventional sheaths, e.g., because the latter can force the corresponding cable to maintain a substantially fixed cross-sectional shape throughout its entire length, including the bent segments of the cable. In contrast, some embodiments of laterally flexible/stretchable sheaths 210 may allow for significant changes of the cross-sectional shape of cable 102 when the latter is bent or otherwise deformed to fit into a restricted and/or confined geometry of the available cable conduit, thereby providing a capability to achieve tighter cable turns than the above-mentioned conventional cables without inflicting any internal damage onto the cable.

As shown in FIG. 2C, one may define a circumference C, a longest cross-sectional dimension A, and a shortest cross-sectional dimension B of sheath 210. While these quantities are shown for an example elliptical cross-section, they may be defined on any geometrical shape representing the cross-section of fiber-optic cable 102. According to some embodiments, one or more of the three geometric parameters A, B, and C associated with fiber-optic cable 102 may change when the cable is bent. We refer to the three geometric parameters of a straight section of cable as $A_0$, $B_0$, and $C_0$, respectively. In some embodiments, the cross-section of an unperturbed, straight section of cable may be essentially circular, in which case $A_0 \approx B_0$ and $C_0 \approx \pi A_0$. In some embodiments, the cross-section of an unperturbed, straight section of cable may be essentially square, in which case $A_0 \approx B_0$ and $C_0 \approx 4A_0$. In some embodiments, the cross-section of an unperturbed, straight section of cable may be essentially elliptical, in which case $C_0 \approx \pi([A_0^2+B_0^2]/2)^{1/2}$.

When fiber-optic cable 102 is being bent, e.g., to accommodate a 90-degree turn, laterally flexible/stretchable sheath 210 may change its cross-sectional shape from, e.g., circular (FIG. 2B) to, e.g., elliptical (FIG. 2C). In some embodiments, such a shape change may be nearly permanent and/or at least partially irreversible (e.g., if laterally flexible/stretchable sheath 210 is made from a plastically deformable or malleable material) or substantially reversible (e.g., if laterally flexible/stretchable sheath 210 is made from a deformable material whose elastic limit is not exceeded when the cable is bent). When laterally flexible/stretchable sheath 210 is made from an elastically deformable material, laterally flexible/stretchable sheath 210 can substantially return to its original shape once fiber-optic cable 102 is straightened out after having been bent.

As used herein, the term "laterally flexible" refers to a cable sheath that can maintain a substantially constant cable circumference while allowing the cross-sectional shape of the cable to change in a significant way. For example, in some embodiments, it may be possible to change the circumference of a laterally flexible cable sheath 210 in a bent cable section without damage to optical fiber strands 220 by no more than 10% relative to the circumference $C_0$, i.e., $0.9\,C_0 \le C \le 1.1\,C_0$. At the same time, it may also be possible in such embodiments to change one or both of the dimensions A and B of a laterally flexible cable sheath 210 in a bent cable section without damage to optical fiber strands 220 by more than 20% relative to the dimensions $A_0$ and $B_0$, i.e., in accordance with one or more of the inequalities: $A<0.8A_0$, $A>1.2A_0$, $B<0.8B_0$, and $B>1.2B_0$.

As used herein, the term "laterally stretchable" refers to a cable sheath 210 that can expand and/or contract the cable circumference without damage to optical fiber strands 220, e.g., by more than 10% when subjected to bending strain and/or stress, i.e., $C<0.9C_0$ or $C>1.1C_0$. In some embodiments, a laterally stretchable sheath 210 may allow the overall cross-sectional shape to be approximately maintained while the area of the cross-section expands or contracts during the cable bending without damage to optical fiber strands 220. For example, a generally oval or circular cross-sectional shape may be maintained along the length of the cable while the area of the corresponding cross-sectional oval or circle changes along said length. In some other embodiments, a laterally stretchable sheath may allow the cross-sectional shape of the cable to change in a significant way during bending without damage to optical fiber strands 220. For example, it may be possible to change one or both of the dimensions A and B of a laterally stretchable sheath 210 in a bent cable section without damage to optical fiber strands 220 by more than 20% relative to the dimensions $A_0$ and $B_0$, i.e., in accordance with one or more of the inequalities: $A<0.8A_0$, $A>1.2A_0$, $B<0.8B_0$, and/or $B>1.2B_0$.

In some embodiments, a laterally flexible/stretchable sheath 210 may comprise a relatively thin layer of a suitable elastic material, with the thickness thereof being selected such that: (i) said layer is thick enough to provide sufficient sheath strength for holding the optical fiber strands 220 and strength members 230 appropriately laterally confined and restrained under the sheath; and (ii) said layer is still thin enough to provide sufficient effective elasticity and/or plasticity for changing the cable's cross-sectional shape and/or area along the length of the cable. Example materials that may be used for this purpose include, but are not limited to: (i) various natural and artificial fabrics; (ii) plastic and metal foils; (iii) cellulose and its derivatives; (iv) rubber; (v) neoprene; (v) latex; (vi) lycra; (vii) elastane; and (viii) spandex.

Figure 3A:
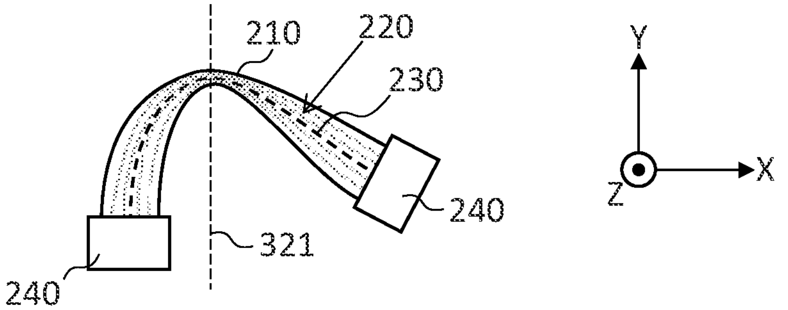
FIGS. 3A-3C pictorially illustrate an optical fiber cable that can be used in the optical communication system of FIG. 1 according to another embodiment.
Figure 3B:
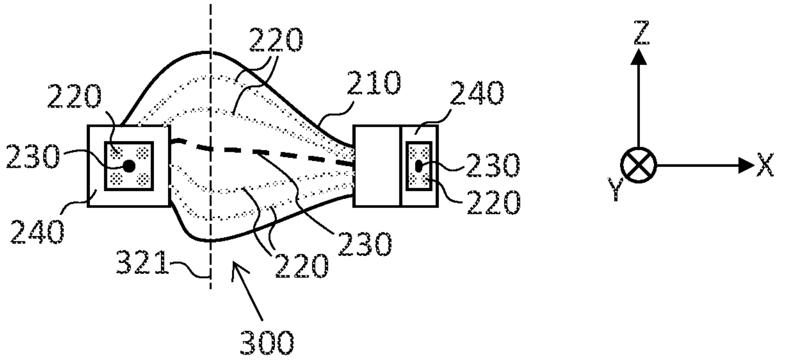
Figure 3C:
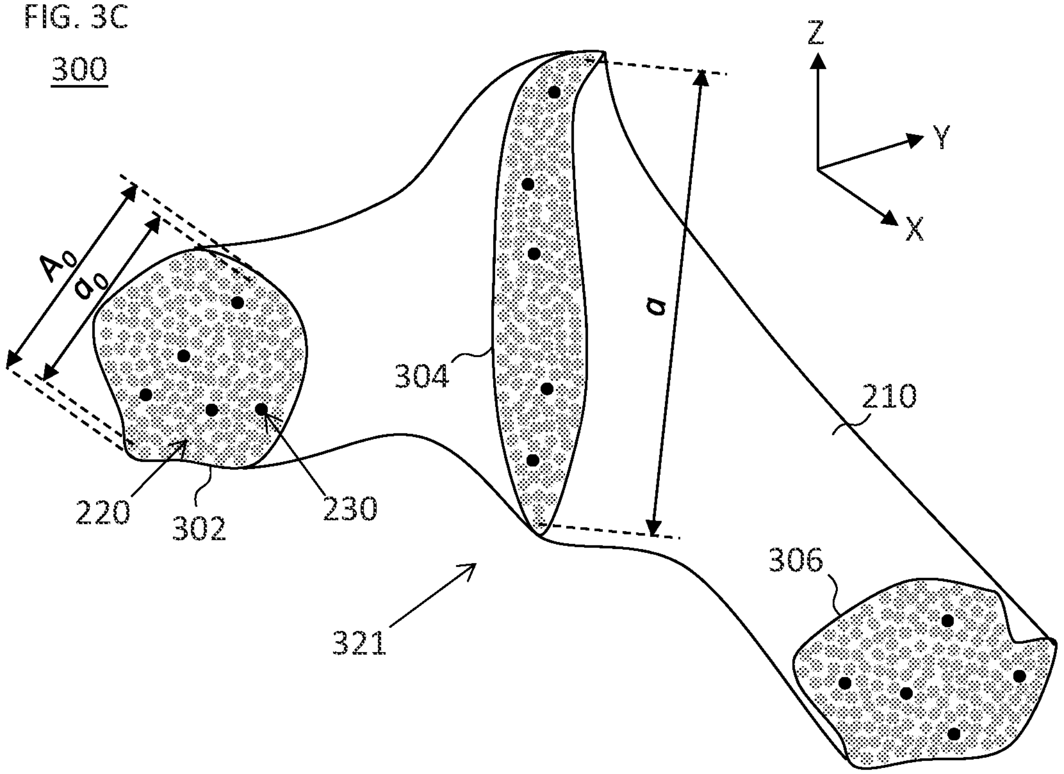

FIGS. 3A-3C pictorially illustrate optical fiber cable 102 that can be used in system 100 (FIG. 1) according to another embodiment. More specifically, FIG. 3A shows a top view of cable 102. FIG. 3B shows a side view of the same cable 102. FIG. 3C shows a three-dimensional (3D) perspective cutout view of a middle segment 300 of said same cable 102. The XYZ-coordinate triads shown in FIGS. 3A-3C indicate the relative orientations of the shown views.

Referring to FIG. 3A, optical fiber cable 102 is shown therein in a configuration that has a sharp (e.g., approximately 90-degree) bend near plane 321. Individual fiber strands 220 are such that each of them can accommodate such a bend without cracking or breaking.

Referring to FIG. 3B, the sheath 210 of the shown cable 102 is laterally flexible and/or stretchable as explained above. This characteristic enables cable 102 to change its cross-sectional shape along its length. For example, FIG. 3B clearly shows that the vertical size (i.e., the size measured along the Z-coordinate axis) of cable 102 is larger in a middle segment 300 thereof than in the end segments thereof immediately adjacent to connectors 240.

FIG. 3C schematically shows the middle segment 300 in more detail. In particular, FIG. 3C schematically shows three cross-sections of the middle segment 300, which cross-sections are labeled 302, 304, and 306, respectively. Cross-section 306 corresponds to plane 321 (also see FIGS. 3A-3B). Cross-sections 302 and 306 correspond to the respective planes that are locally orthogonal to the (bent)

longitudinal axis of cable 102 and located closer to the opposite ends thereof (e.g., near respective connectors 240).

Cross-section 302 has an approximately pentagonal shape, with rounded corners. Cross-section 304 has an approximately oval shape characterized by a relatively large aspect ratio (e.g., >4). Cross-section 306 has an irregular non-convex shape. A person of ordinary skill in the art will understand that the shown shapes represent non-limiting examples and that many other cross-sectional shapes are possible. Visual inspection of the shown example cross-sectional shapes 302, 304, and 306 reveals that fiber strands 220 and strength members 230 can be relatively spatially rearranged from one cross-section to the next, e.g., to spread out laterally within sheath 210 more in some segments than in other segments. The latter property enables, inter alia, the sharp cable bend near plane 321.

During bending, at least some of the optical fiber strands 220 contained within the flexible/stretchable sheath 210 may be subject to relative lateral movement, whereby the relative positions between at least some of optical fiber strands 220 may change in a bent section of the cable compared to a straight section thereof. In one example embodiment, the largest distance between two optical fiber strands contained within the sheath in a bent section of the cable (a in FIG. 3C) may become larger than the largest distance between two optical fiber strands contained within the sheath in an unperturbed, straight section of the cable (do in FIG. 3C), i.e., $a>a_0$. In some embodiments, the largest distance between two optical fiber strands contained within the sheath in a bent section of the cable (a in FIG. 3C) may become larger than the largest dimension of the cross-sectional area of the sheath in an unperturbed, straight section of cable ($A_0$ in FIG. 3C), i.e., $a>A_0$.

FIGS. 4A-4F schematically show cross-section 302 (FIG. 3C) according to some embodiments. More specifically, FIGS. 4A-4F provide some examples of how strength members 230 can be placed and/or distributed in cable 102.

Figure 4A:
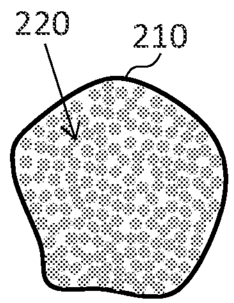
FIGS. 4A-4F schematically show example cross-sections of the optical fiber cable of FIG. 3 according to some embodiments.

FIG. 4A illustrates an embodiment in which no dedicated strength members 230 are being used. In this particular embodiment, the plurality of fiber strands 220 themselves also act as strength elements of the cable. In some embodiments, sheath 210 may have some axial strength that contributes to the overall axial strength of cable 102.

Figure 4B:
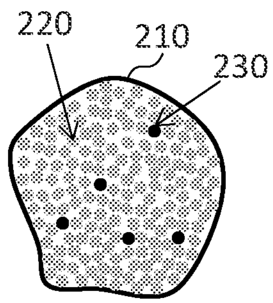

FIG. 4B illustrates an embodiment in which strength members 230 are relatively widely distributed (e.g., approximately uniformly or non-uniformly) throughout the interior of cable 102 within sheath 210. Strength members 230 can be redistributed within sheath 210, e.g., as indicated in FIG. 3C, when cable 102 is bent.

Figure 4C:
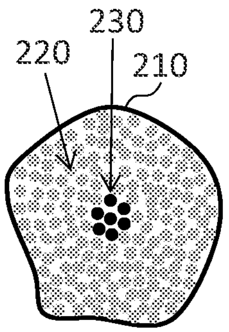

FIG. 4C illustrates an embodiment in which multiple strength members 230 are located near the cross-sectional center of cable 102. Such multiple strength members may or may not be connected to form a structural bundle.

Figure 4D:
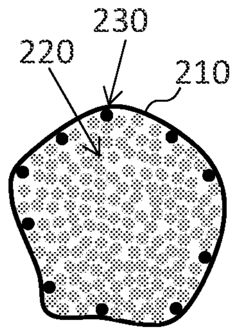

FIG. 4D illustrates an embodiment in which strength members 230 are located near the inner surface of sheath 210. In some embodiments, one or more such strength members 230 may be attached (e.g., glued) to the inner surface of sheath 210.

Figure 4E:
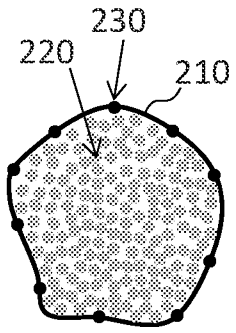

FIG. 4E illustrates an embodiment in which strength members 230 are embedded into sheath 210. In one possible embodiment, strength members 230 may be woven into a laterally flexible/stretchable fabric used in sheath 210. Alternatively or in addition, strength members 230 may be sandwiched between different thin layers of flexible/stretchable material used in sheath 210.

Figure 4F:
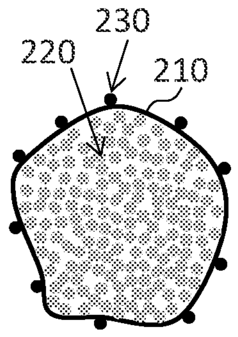

FIG. 4F illustrates an embodiment in which strength members 230 are positioned at the outer surface of sheath 210. In some embodiments, one or more such strength members 230 may be attached (e.g., glued) to sheath 210.

Alternatively or in addition, in any of the above embodiments, strength members 230 may be attached to the housing (s) of connector(s) 240 at the opposite ends of cable 102, or may be fed through sheath 210 to the outside of the cable, e.g., to make the strength members directly accessible during cable pulling.

Figure 5A:
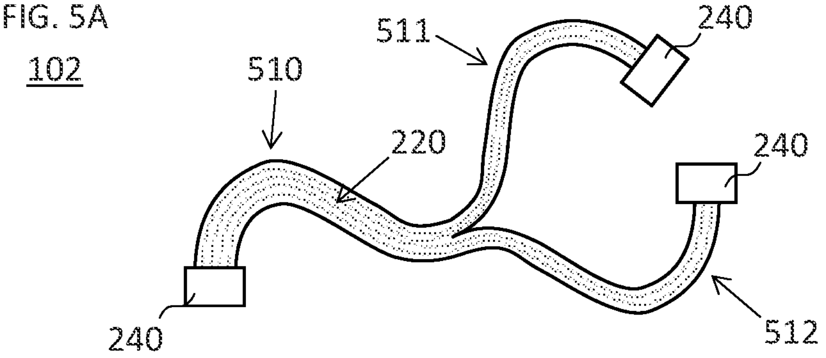
FIGS. 5A-5B schematically show example branching optical fiber cables that can be used in the optical communication system of FIG. 1 according to some embodiments.
Figure 5B:
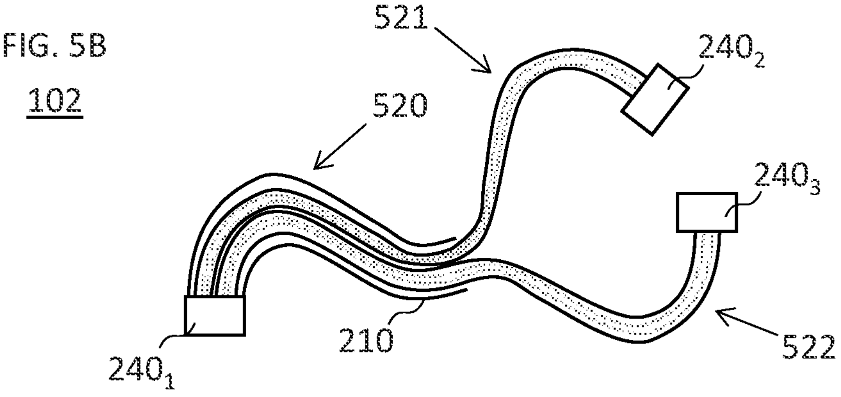

FIGS. 5A-5B schematically show some alternative embodiments of cable 102. More specifically, in such embodiments, cable 102 may comprise more than one connector 240 at one end or both ends thereof.

FIG. 5A illustrates an embodiment in which a sheathed trunk 510 splits into sheathed branches 511 and 512, each having a respective subset of optical fiber strands 220 of the trunk 510. At least one of trunk 510 and branches 511 and 512 includes sheath 210. The remainder may have sheaths that may or may not be laterally flexible or stretchable. In some embodiments, the sheaths of trunk 510 and branches 511 and 512 may comprise the same material. In some embodiments, the sheaths of trunk 510 and branches 511 and 512 may comprise different respective materials.

FIG. 5B illustrates an embodiment in which cable 102 comprises cables 521 and 522 and connectors $\mathbf{240_1}$, $\mathbf{240_2}$, and $\mathbf{240_3}$. Cables 521 and 522 share connector $\mathbf{240_1}$ and have connectors $\mathbf{240_2}$ and $\mathbf{240_3}$, respectively, at the other cable end. Near connector $\mathbf{240_1}$, cables 521 and 522 are arranged in a trunk 520 that has laterally flexible or stretchable sheath 210 at an outer surface thereof. The sheath 210 of trunk 520 encloses the corresponding segments of cables 521 and 522, each carrying a respective subset of optical fibers 220. In some embodiments, the sheath 210 of trunk 520 may enclose more than two cables similar to cables 521 and 522.

Cables 521 and 522 may have respective sheaths that may or may not be laterally flexible or stretchable. Embodiments with any number of connectors 240 on either end of cable 102 and with at least one laterally flexible or stretchable sheath 210 are also contemplated. In view of this disclosure, a person of ordinary skill in the art will be able to make and use such embodiments without any undue experimentation. Although strength members 230 are not explicitly shown in FIGS. 5A-5B, such strength members may be incorporated into the corresponding cables 102, e.g., in accordance with any of FIGS. 4B-4F.

Referring back to FIG. 1, in some embodiments, at least some cables 102 in system 100 may be deployed using one or more cable raceways. In cable-management arts, a raceway (also sometimes referred to as a raceway system) is a rigid enclosed or semi-enclosed channel or conduit that protects, routes, and/or hides cables and wires. Raceways may protect wires and cables from heat, humidity, corrosion, water intrusion, and other physical threats. A well-grounded metallic raceway may also provide radio frequency (RF) shielding that reduces electromagnetic interference (EMI). A plastic raceway may be used, e.g., when EMI is not relevant. For example, cables 102 may be deployed using metallic or plastic raceways.

Figure 6A:
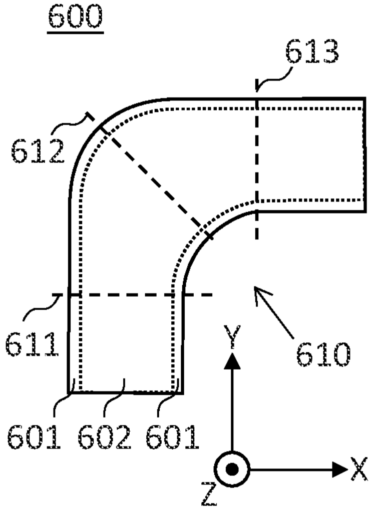
FIGS. 6A-6E schematically show a raceway that can be used in the optical communication system of FIG. 1 according to an embodiment.
Figure 6B:
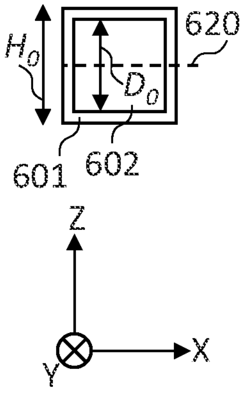
Figure 6C:
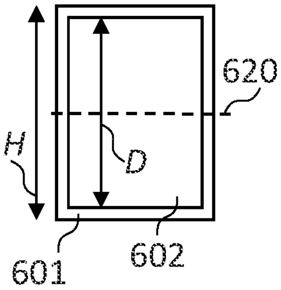
Figure 6D:
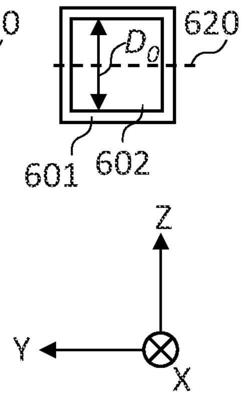
Figure 6E:
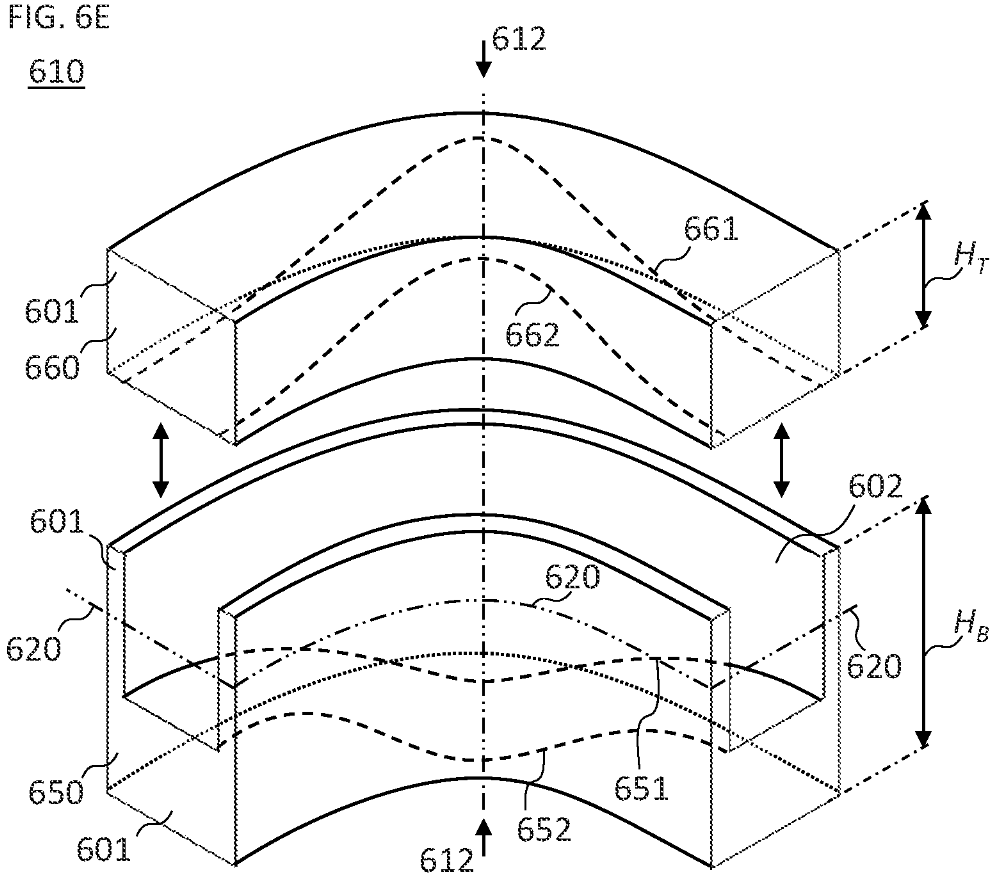

FIGS. 6A-6E schematically show a section of a raceway 600 that can be used to deploy one or more cables 102 in system 100 according to an embodiment. More specifically, FIG. 6A shows a top view of a section of raceway 600. FIGS. 6B-6D show three cross-sectional views of a section of raceway 600 at positions 611, 612, and 613 indicated in FIG. 6A. FIG. 6E pictorially shows a curved middle portion 610 of a section of raceway 600 in more detail (also see FIG. 6A). The XYZ-coordinate triads shown in FIGS. 6A, 6B, and 6D indicate the relative orientations of the shown views.

Referring to FIGS. 6A-6D, a section of raceway 600 comprises walls 601 forming an inner opening 602 as a hollow conduit for one or more fiber-optic cables 102. Within a section of raceway 600, the hollow conduit proceeds substantially along a main plane 620 of that section. One or more cables 102 may be deployed substantially along the main plane 620 of that raceway section. As used herein, the term "main plane" refers to a plane drawn approximately through the geometrical centroids of the inner opening's local cross-sections of raceway 600. In some embodiments, the main plain may be parallel to the surface of the floor on which raceway 600 is laid down.

In an example embodiment, one or more of the cross-sectional dimensions of the inner opening 602 of raceway 600 may change within the curved middle portion 610 of raceway 600, e.g., as indicated in FIGS. 6B-6D.

In one possible embodiment, the largest cross-sectional dimension (D in FIG. 6C) of the inner opening 602 in the curved middle portion 610 of raceway 600 (e.g., at position 612), measured in the direction orthogonal to the main plane 620 may be larger than the largest cross-sectional dimension ($D_0$ in FIGS. 6B and 6D) of the inner opening 602 in a straight portion (e.g., at positions 611 and 613) of raceway 600, measured in the direction orthogonal to the main plane, i.e., $D>D_0$. This feature enables raceway 600 to accommodate the lateral expansion of cable 102 at a bend, e.g., such as the lateral expansion near plane 321 illustrated in FIGS. 3B-3C. In the example embodiment illustrated by FIGS. 6B-6D, the inner opening 602 of raceway 600 is shaped to expand up and down with respect to the main plane 620 (also see FIG. 6E).

FIG. 6E pictorially illustrates example three-dimensional geometry of the inner opening 602 of raceway 600 within curved middle portion 610. As shown in FIG. 6E, raceway 600 comprises a bottom part 650 and a top part 660 that can be joined together as indicated by the double-headed arrows to form walls 601 and inner opening 602. The dashed lines 651, 652, 661, and 662 indicate the inner edges of the inner opening 602. The curvature of the inner edges 651, 652, 661, and 662 is such that the cross-sectional dimension changes indicated in FIGS. 6B-6D are realized.

In some embodiments, inner opening 602 of raceway 600 may be completely surrounded by walls 601. In some other embodiments, inner opening 602 of raceway 600 may only be partially surrounded by walls 601, e.g., the hollow conduit may not have a top wall.

Figure 7A:
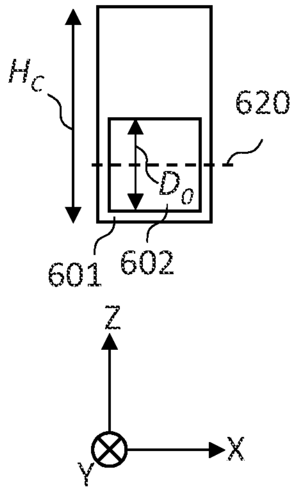
FIGS. 7A-7C schematically show a section of a raceway that can be used in the optical communication system of FIG. 1 according to another embodiment.
Figure 7B:
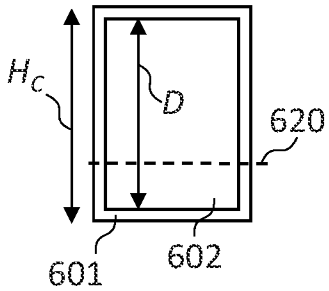
Figure 7C:
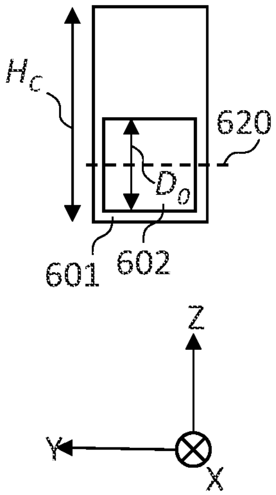

FIGS. 7A-7C schematically show a section of raceway 600 that can be used to deploy one or more cables 102 in system 100 according to another embodiment. More specifically, FIGS. 7A-7C show three cross-sectional views of a section of raceway 600 at positions 611, 612, and 613 indicated in FIG. 6A. The XYZ-coordinate triads shown in FIGS. 7A and 7C indicate the relative orientations of the shown views. In this particular embodiment, at position 612, the inner opening 602 expands asymmetrically above and below the main plane 620 corresponding to positions 611 and 613. For example, there is a larger expansion above said main plane 620 than below said main plane, e.g., as indicated in FIG. 7B.

In some embodiments, the external height of raceway 600 may change between a value $H_0$ for a straight section and a value $H>H_0$ for a curved section, as visualized in FIGS. 6B-6D. In some other embodiments, the external height of raceway 600 may have a substantially constant value $H_C$ for both a straight section and a curved section, as visualized in FIGS. 7A-7C. In some embodiments, the external height of raceway 600 may be the sum of the height of a bottom part $H_B$ and the height of a top part $H_T$, as visualized in FIG. 6E.

According to an example embodiment disclosed above, e.g., in the summary section and/or in reference to any one or any combination of some or all of FIGS. 1-7, provided is a fiber-optic cable (e.g., 102, FIG. 1) comprising a cable segment (e.g., 300, FIGS. 3B-3C; 520, FIG. 5B) that has a plurality of optical fibers (e.g., 220, FIG. 2, 3, 4, or 5) laterally encased by a cable sheath (e.g., 210, FIG. 2, 3, 4, or 5); and the cable segment is constructed to permit relative lateral movement of at least some of the optical fibers within the cable sheath (e.g., as illustrated by comparison of 302, 304, 306, FIG. 3C) to change a cross-sectional shape of the cable segment.

In some embodiments of the above fiber-optic cable, the cable segment is configured to change the cross-sectional shape in response to being bent.

In some embodiments of any of the above fiber-optic cables, in a bent portion of the cable segment, a pair of the optical fibers is laterally separated by a larger distance than any two of the optical fibers in a straight portion of the cable segment (e.g., $a>a_0$, FIG. 3C).

In some embodiments of any of the above fiber-optic cables, in a bent portion of the cable segment, a pair of the optical fibers is laterally separated by a larger distance than any two points in an orthogonal cross-section of a straight portion of the cable segment (e.g., $a>A_0$, FIG. 3C).

In some embodiments of any of the above fiber-optic cables, the cable sheath comprises a layer of a laterally flexible material.

In some embodiments of any of the above fiber-optic cables, the cable sheath comprises a layer of a laterally stretchable material.

In some embodiments of any of the above fiber-optic cables, the plurality of optical fibers comprises at least 100 optical fibers.

In some embodiments of any of the above fiber-optic cables, the plurality of optical fibers comprises at least 1000 optical fibers.

In some embodiments of any of the above fiber-optic cables, the cable segment further comprises one or more strength members (e.g., 230, FIGS. 3-4).

In some embodiments of any of the above fiber-optic cables, the cable segment is constructed to permit lateral movement of at least some of the optical fibers with respect to the one or more strength members (e.g., as illustrated by comparison of 302, 304, 306, FIG. 3C).

In some embodiments of any of the above fiber-optic cables, at least some of the strength members are distributed throughout an interior of the cable (e.g., 230, FIG. 4B).

In some embodiments of any of the above fiber-optic cables, at least some of the strength members are more concentrated near a center of the cable (e.g., 230, FIG. 4C).

In some embodiments of any of the above fiber-optic cables, at least some of the strength members are attached to an inner surface of the cable sheath (e.g., 230, FIG. 4D).

In some embodiments of any of the above fiber-optic cables, at least some of the strength members are embedded within the cable sheath (e.g., 230, FIG. 4E).

In some embodiments of any of the above fiber-optic cables, at least some of the strength members are attached to an outer surface of the cable sheath (e.g., 230, FIG. 4F).

According to another example embodiment disclosed above, e.g., in the summary section and/or in reference to any one or any combination of some or all of FIGS. 1-7, provided is an apparatus comprising a raceway (e.g., 600, FIG. 6) having a hollow cable conduit (e.g., 602, FIG. 6), the hollow cable conduit having a curved portion and a straight portion connected to the curved portion, the curved portion of the hollow cable conduit having a larger cross-sectional size (e.g., D, FIG. 6C) measured orthogonally to a main plane of the raceway than a corresponding cross-sectional size (e.g., $D_0$, FIG. 6B) of the straight portion of the hollow cable conduit.

In some embodiments of the above apparatus, the raceway has a substantially constant height along the curved and straight portions (e.g., as in FIGS. 7A-7C and in FIG. 6E), said height being measured orthogonally to the main plain.

In some embodiments of any of the above apparatus, the raceway has a larger height along the curved portion than along the straight portion (e.g., compare FIGS. 6B and 6C), said height being measured orthogonally to the main plain.

In some embodiments of any of the above apparatus, the apparatus further comprises a fiber-optic cable (e.g., 102, FIG. 1) laid in the hollow cable conduit of the raceway.

In some embodiments of any of the above apparatus, the fiber-optic cable comprises a cable segment (e.g., 300, FIGS. 3B-3C; 520, FIG. 5B) that has a plurality of optical fibers (e.g., 220, FIG. 2, 3, 4, or 5) laterally encased by a cable sheath (e.g., 210, FIG. 2, 3, 4, or 5); and the cable segment is constructed to permit relative lateral movement of at least some of the optical fibers within the cable sheath (e.g., as illustrated by comparison of 302, 304, 306, FIG. 3C) to change a cross-sectional shape of the cable segment.

While this disclosure includes references to illustrative embodiments, this specification is not intended to be construed in a limiting sense. Various modifications of the described embodiments, as well as other embodiments within the scope of the disclosure, which are apparent to persons skilled in the art to which the disclosure pertains are deemed to lie within the principle and scope of the disclosure, e.g., as expressed in the following claims.

Some embodiments may be implemented as circuit-based processes, including possible implementation on a single integrated circuit.

It will be further understood that various changes in the details, materials, and arrangements of the parts which have been described and illustrated in order to explain the nature of this disclosure may be made by those skilled in the art without departing from the scope of the disclosure, e.g., as expressed in the following claims.

Unless explicitly stated otherwise, each numerical value and range should be interpreted as being approximate as if the word "about" or "approximately" preceded the value or range.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

Unless otherwise specified herein, the use of the ordinal adjectives "first," "second," "third," etc., to refer to an object of a plurality of like objects merely indicates that different instances of such like objects are being referred to, and is not intended to imply that the like objects so referred-to have to be in a corresponding order or sequence, either temporally, spatially, in ranking, or in any other manner.

Throughout the detailed description, the drawings, which are not to scale, are illustrative only and are used in order to explain, rather than limit the disclosure. The use of terms such as height, length, width, top, bottom, is strictly to facilitate the description of the embodiments and is not intended to limit the embodiments to a specific orientation. For example, height does not imply only a vertical rise limitation, but is used to identify one of the three dimensions of a three-dimensional structure as shown in the figures. Such "height" would be vertical where the raceway is horizontal, but would be horizontal where the raceway is vertical, and so on.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

The description and drawings merely illustrate the principles of the disclosure. It will thus be appreciated that those of ordinary skill in the art will be able to devise various arrangements that, although not explicitly described or shown herein, embody the principles of the disclosure and are included within its spirit and scope. Furthermore, all examples recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions. Moreover, all statements herein reciting principles, aspects, and embodiments of the disclosure, as well as specific examples thereof, are intended to encompass equivalents thereof.

What is claimed is:

1. A communication system comprising:

at least two optical communication devices; and at least one fiber-optic cable that interconnects the at least two optical communication devices, wherein each of the at least one fiber-optic cable comprises a cable segment that has a plurality of optical fibers laterally encased by a cable sheath;

wherein the cable segment when straight has a longest cross-sectional dimension $A_0$ and a shortest cross-sectional dimension $B_0$;

wherein the cable segment is constructed to permit relative lateral movement of at least some of the optical fibers within the cable sheath to change a cross-sectional shape of the cable segment upon bending of the cable segment greater than a predetermined degree such that the bent cable segment has a longest cross-sectional dimension $A_1$ and a shortest cross-sectional dimension B1, and at least one of (i) $A_1<0.8\times A_0$ or $A_1>1.2\times A_0$, or (ii) $B_1<0.8\times B_0$ or $B_1>1.2\times B_0$.

2. The communication system of claim 1, comprising at least one external optical power supply module configured to produce light for use in the at least two optical communication devices.

3. The communication system of claim 1, wherein the cable segment is configured to change the cross-sectional shape in response to being bent.

4. The communication system of claim 3, wherein, in a bent portion of the cable segment, a pair of the optical fibers is laterally separated by a larger distance than any two of the optical fibers in a straight portion of the cable segment.

5. The communication system of claim 3, wherein, in a bent portion of the cable segment, a pair of the optical fibers is laterally separated by a larger distance than any two points in an orthogonal cross-section of a straight portion of the cable segment.

6. The communication system of claim 1, wherein the cable sheath comprises a layer of a laterally flexible material.

7. The communication system of claim 1, wherein the cable sheath comprises a layer of a laterally stretchable material.

8. The communication system of claim 1, wherein the plurality of optical fibers comprises at least 100 optical fibers.

9. The communication system of claim 1, wherein the plurality of optical fibers comprises at least 1000 optical fibers.

10. The communication system of claim 1, wherein each cable segment comprises one or more strength members.

11. The communication system of claim 10, wherein the cable segment is constructed to permit lateral movement of at least some of the optical fibers with respect to the one or more strength members.

12. The communication system of claim 10, wherein at least some of the strength members are distributed throughout an interior of the cable.

13. The communication system of claim 12, wherein at least some of the strength members are more concentrated near a center of the cable.

14. The communication system of claim 10, wherein at least some of the strength members are attached to an inner surface of the cable sheath.

15. The communication system of claim 10, wherein at least some of the strength members are embedded within the cable sheath.

16. The communication system of claim 10, wherein at least some of the strength members are attached to an outer surface of the cable sheath.

17. A communication system comprising:

at least two optical communication devices;

at least one raceway having a hollow cable conduit, the hollow cable conduit having a curved portion and a straight portion connected to the curved portion, the curved portion of the hollow cable conduit having a larger cross-sectional size measured orthogonally to a main plane of the raceway than a corresponding cross-sectional size of the straight portion of the hollow cable conduit; and at least one fiber-optic cable laid in the at least one hollow cable conduit of the raceway, wherein the at least one fiber-optic cable interconnects the at least two optical communication devices, each of the at least one fiber-optic cable comprising a cable segment that has a plurality of optical fibers laterally encased by a cable sheath, the cable segment comprises one or more strength members, and the cable segment is constructed to permit lateral movement of at least some of the optical fibers with respect to the one or more strength members.

18. The communication system of claim 17, comprising at least one external optical power supply module configured to produce light for use in the at least two optical communication devices.

19. The communication system of claim 17, wherein the raceway has a substantially constant height along the curved and straight portions, said height being measured orthogonally to the main plain.

20. The communication system of claim 17, wherein the raceway has a larger height along the curved portion than along the straight portion, said height being measured orthogonally to the main plain.

21. A communication system comprising:

at least two optical communication devices; and at least one fiber-optic cable that interconnects the at least two optical communication devices, wherein each of the at least one fiber-optic cable comprises a cable segment that has a plurality of optical fibers laterally encased by a cable sheath;

wherein the plurality of optical fibers are permitted to move laterally relative to one another to become relatively spatially rearranged from a first cross-section of the cable segment to a second cross-section of the cable segment; and wherein the cable sheath comprises a laterally stretchable material that permits a cross-sectional shape of the cable segment to change in response to movement of the optical fibers within the cable sheath.

22. The communication system of claim 21, comprising at least one external optical power supply module configured to produce light for use in the at least two optical communication devices.

23. The communication system of claim 21, wherein the cable segment comprises one or more strength members, and the cable segment is constructed to permit lateral movement of at least some of the optical fibers with respect to the one or more strength members.

24. The communication system of claim 21, wherein each of the plurality of optical fibers comprises a coating, and wherein a cross-sectional diameter of each of the plurality of optical fibers does not exceed 900 micrometers.

25. The communication system of claim 21, wherein the cable segment is terminated by one or more connectors configured to interface with at least one of an optical communication device, an optical power supply, and a multiplexing unit.

26. The communication system of claim 25, wherein the plurality of optical fibers are arranged within a rectangular cross-section of the one or more connectors.

27. A method of operating a communication system, the method comprising:

providing at least two optical communication devices;

transmitting signals between the at least two optical communication devices through at least one fiber-optic cable, wherein each of the at least one fiber-optic cable comprises a cable segment that has a plurality of optical fibers laterally encased by a cable sheath, the cable segment comprises one or more strength members;

laterally moving at least some of the optical fibers within the cable sheath to change a cross-sectional shape of the cable segment; and laterally moving at least some of the optical fibers with respect to the one or more strength members.

28. The method of claim 27, comprising providing at least one external optical power supply module configured to produce light for use in the at least two optical communication devices.

29. A method of assembling a communication system, the method comprising:

providing at least two optical communication devices; and interconnecting the at least two optical communication devices using at least one fiber-optic cable, wherein each of the at least one fiber-optic cable comprises a cable segment that has a plurality of optical fibers laterally encased by a cable sheath, the cable segment comprises one or more strength members;

wherein the cable segment is constructed to permit relative lateral movement of at least some of the optical fibers within the cable sheath to change a cross-sectional shape of the cable segment and the cable segment is constructed to permit lateral movement of at least some of the optical fibers with respect to the one or more strength members.

30. The method of claim 29, comprising providing at least one external optical power supply module configured to produce light for use in the at least two optical communication devices.

31. A method of operating a communication system, the method comprising:

providing at least two optical communication devices;

providing at least one raceway having a hollow cable conduit, the hollow cable conduit having a curved portion and a straight portion connected to the curved portion, the curved portion of the hollow cable conduit having a larger cross-sectional size measured orthogonally to a main plane of the raceway than a corresponding cross-sectional size of the straight portion of the hollow cable conduit; and transmitting signals between the at least two optical communication devices through at least one fiber-optic cable laid in the at least one hollow cable conduit of the raceway, wherein each of the at least one fiber-optic cable comprises a cable segment that has a plurality of optical fibers laterally encased by a cable sheath, the cable segment comprises one or more strength members, and the cable segment is constructed to permit lateral movement of at least some of the optical fibers with respect to the one or more strength members.

32. The method of claim 31, comprising providing at least one external optical power supply module configured to produce light for use in the at least two optical communication devices.

33. A method of operating a communication system, the method comprising:

providing at least two optical communication devices;

transmitting signals between the at least two optical communication devices through at least one fiber-optic cable, wherein each of the at least one fiber-optic cable comprises a cable segment that has a plurality of optical fibers laterally encased by a cable sheath, the cable segment comprises one or more strength members, moving the plurality of optical fibers laterally relative to one another to become relatively spatially rearranged from a first cross-section of the cable segment to a second cross-section of the cable segment, laterally moving at least some of the optical fibers with respect to the one or more strength members, and changing a cross-sectional shape of the cable segment in response to movement of the optical fibers within the cable sheath.

34. The method of claim 33, comprising providing at least one external optical power supply module configured to produce light for use in the at least two optical communication devices.

* * * * *